United States Patent
Shestakov et al.

(10) Patent No.: US 8,060,411 B2
(45) Date of Patent: Nov. 15, 2011

(54) METHOD AND SYSTEM FOR GENERATING AN AUTOMATIC AUTHORIZATION

(75) Inventors: Oleg Shestakov, Eppelheim (DE); Erwin Pinter, Speyer (DE); Jens Kisker, Heidelberg (DE); Karin Brecht-Tillinger, Edingen-Neckarhausen (DE); Christina Lies, Munich (DE)

(73) Assignee: Sap AG, Walldorf (DE)

( * ) Notice: Subject to any disclaimer, the term of this patent is extended or adjusted under 35 U.S.C. 154(b) by 1420 days.

(21) Appl. No.: 10/553,707

(22) PCT Filed: Apr. 2, 2004

(86) PCT No.: PCT/EP2004/050436
§ 371 (c)(1),
(2), (4) Date: Oct. 26, 2006

(87) PCT Pub. No.: WO2004/092988
PCT Pub. Date: Oct. 28, 2004

(65) Prior Publication Data
US 2007/0038566 A1 Feb. 15, 2007

(30) Foreign Application Priority Data
Apr. 17, 2003 (EP) .................................... 03008747

(51) Int. Cl.
*G06Q 30/00* (2006.01)
(52) U.S. Cl. .................................................. 705/26.1
(58) Field of Classification Search .................... 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 6,735,569 B1 * | 5/2004 | Wizig | 705/4 |
| 6,922,815 B2 * | 7/2005 | Rosen | 715/782 |
| 7,472,379 B2 * | 12/2008 | Chessell et al. | 717/132 |
| 2002/0135538 A1 * | 9/2002 | Rosen | 345/1.1 |
| 2002/0180810 A1 * | 12/2002 | Charters et al. | 345/853 |
| 2002/0184616 A1 * | 12/2002 | Chessell et al. | 717/132 |
| 2003/0074278 A1 * | 4/2003 | Keohane et al. | 705/27 |
| 2003/0210279 A1 * | 11/2003 | Masuda | 345/810 |

OTHER PUBLICATIONS

Pennings et al. "To Spend or Not to Spend? The Effect of Budget Constraints on Estimation Processes and Spending Behavior", Advances in Consumer Research, vol. 32, 2005, pp. 328-329.*

* cited by examiner

*Primary Examiner* — Naeem Haq
(74) *Attorney, Agent, or Firm* — Kenyon & Kenyon LLP

(57) ABSTRACT

A system and method for generating an automatic authorization of a shopping cart created during a procedure of electronic procurement of items depending on values stored in a database table. Data is retrieved from a database table. The data may represent a budget-value and data representing a cumulative amount spent during a specified time period assigned to the user performing the electronic procurement. The total value of items in the shopping cart is calculated. And, a sum of the value of the cumulative amount spent and the total value of items in the shopping cart is compared with the budget-value. If the sum lies within the budget-value, then the authorization may be generated, and the value of the cumulative amount spent by the total value of items in the shopping cart may be updated. If the sum does not lie within the budget-value, an indication is generated indicating that the budget is exceeded.

13 Claims, 4 Drawing Sheets

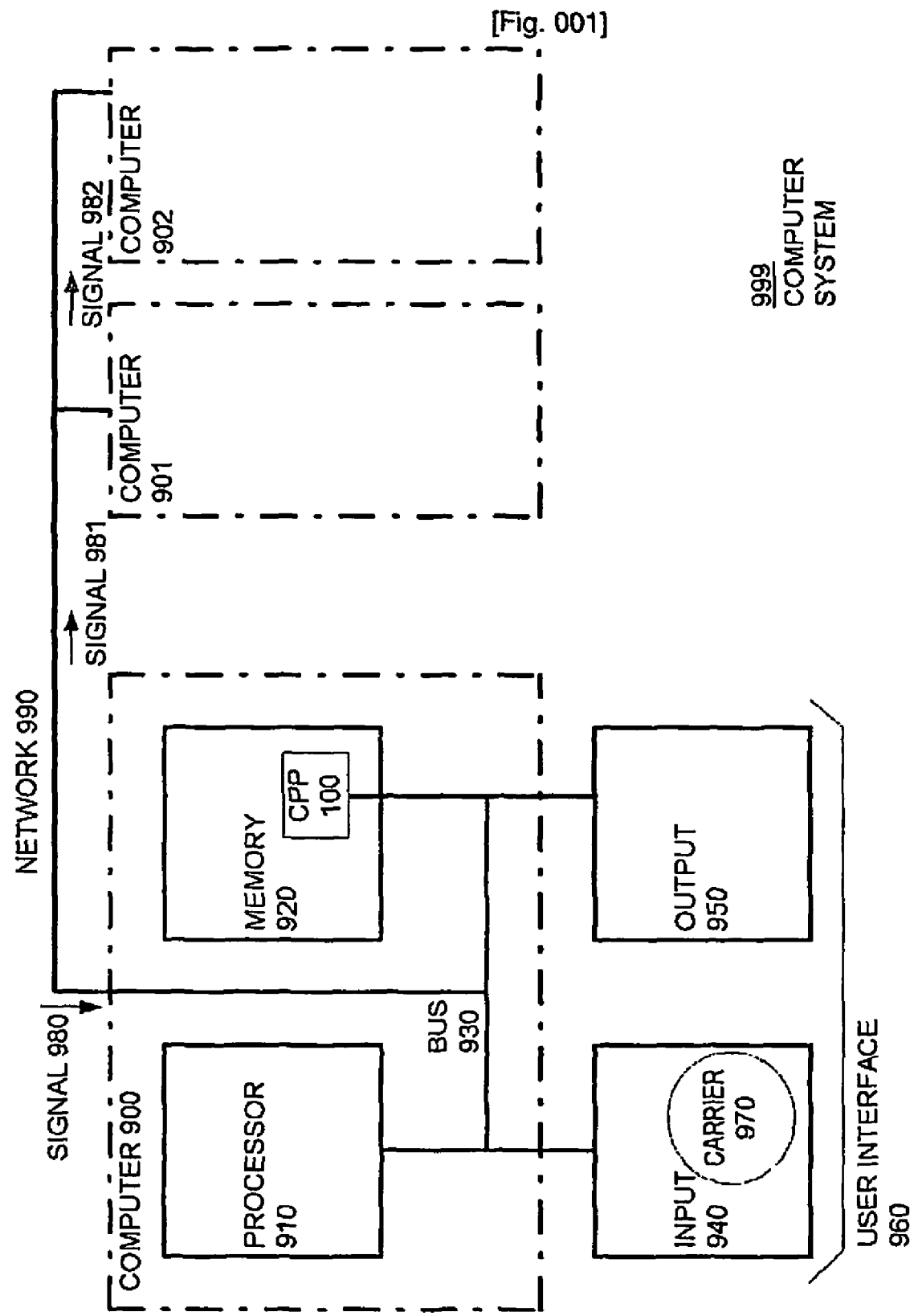

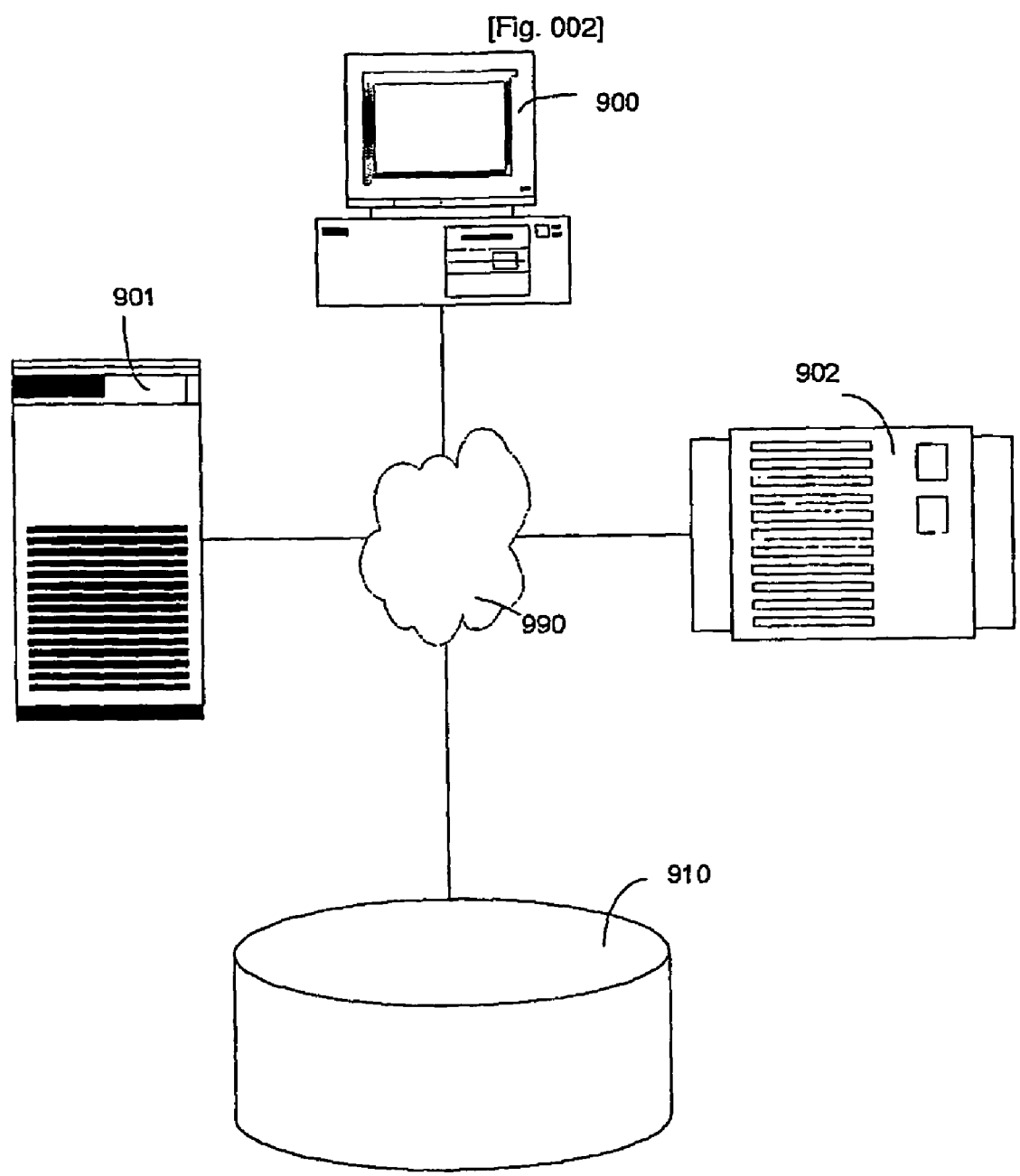
[Fig. 002]

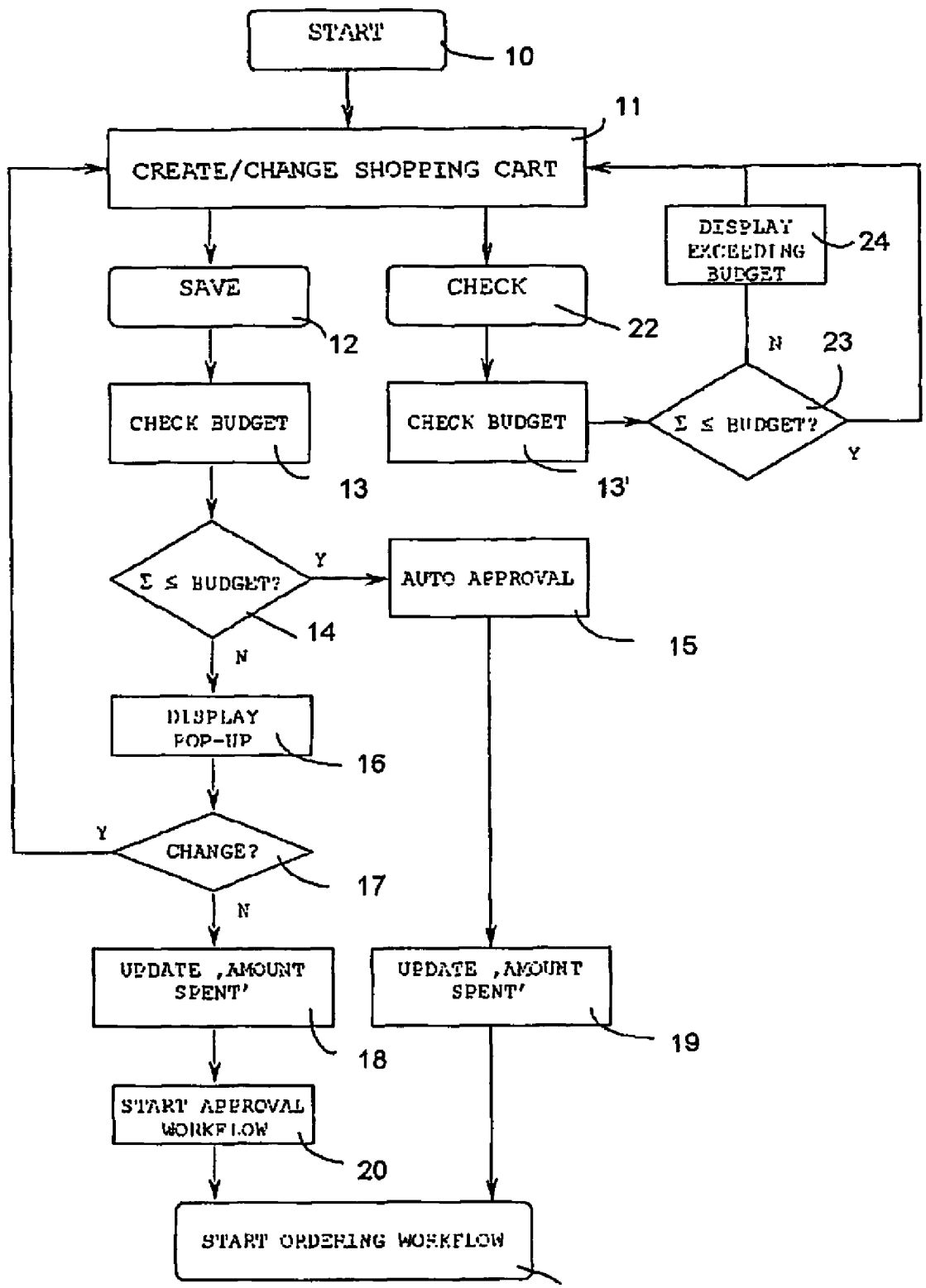

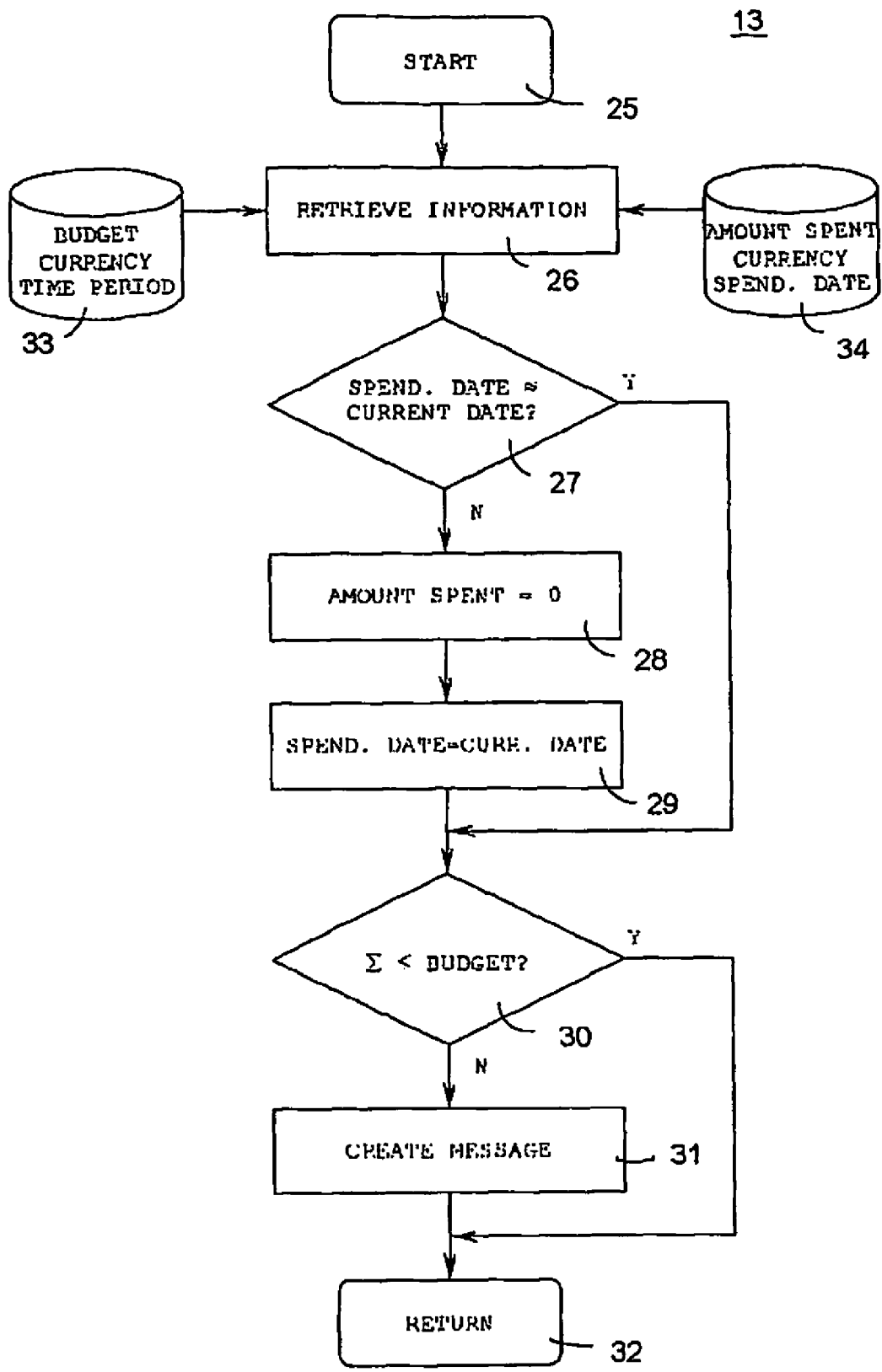
[Fig. 004]

METHOD AND SYSTEM FOR GENERATING AN AUTOMATIC AUTHORIZATION

TECHNICAL FIELD

The present invention relates to a method and system for generating an automatic authorization of shopping carts created during a procedure of electronic procurement of goods or services.

BACKGROUND ART

Within a particular business, typically there are well-established requisition rules regarding the procedure to be followed in the procurement of goods and services, e.g., computer equipment or office supplies. Requisition rules will vary from company to company, depending upon a number of factors.

In a first step, the individual within the business entity (hereinafter referred to as a "company") identifies a need and selects desired goods or services from a catalogue provided by internal or external suppliers.

An authorization step requires designated individuals to approve the purchase of the goods or services. Within the requisition rules, the designated individuals may be identified in what is referred to as an "authorization workflow." The authorization workflow may identify a single person, e.g., a finance manager, or a number of individuals. The authorization workflow for two independent companies is not likely to be the same.

If the requisition is approved, a purchase order is generated. The purchase order is sent to a vendor of the requested goods or services. The vendor then supplies the requested item, i.e., goods or services. Payment may be sent with the purchase order, but is typically sent in response to an invoice generated by the vendor for delivery with the item.

Electronic procurement systems simplify this procedure by providing users with virtual shops offering different items to be ordered online. Typically they are set up in a computer network using a client server structure. After accessing a virtual shop a showcase containing representations of items available in the shop is displayed on the user screen. The user performs his/her procurement by selecting representations of the items to be ordered and by putting the items into a representation of a shopping cart also displayed on the screen. An authorization process is started at the end of the procedure, usually when the shopping cart is being saved for further processing.

A typical authorization scenario includes the value of total shopping cart contents being compared either to a fixed amount stored in the system, or to a spending limit (sometimes called budget) defined by the purchaser's position within the company's organizational structure, or by the purchaser's role within the workflow or by purchaser's definition as user. If the value of the total shopping cart contents is below the fixed amount or spending limit an automated approval is generated. If the value of total shopping cart contents is above the fixed amount or spending limit an approval workflow is started which implements for example at least one manager's approval. Alternatively the purchaser can successively remove items from the shopping cart until a shopping cart value below the fixed amount or spending limit is reached.

This functionality is thought not appropriate for professional buyers but is suitable for desktop users carrying out low value purchases. It enables employees to order/purchase goods and services up to the specified amount without getting a manager's approval each time and thus reduces the total expenses for purchases.

It constitutes a main disadvantage of the above outlined authorization scenario that users can create multiple shopping carts in the procurement system each with a value slightly below the approval threshold thus creating procurement transactions above their approved limits without further approval.

DISCLOSURE OF INVENTION

Generally, the invention provides a method for automated procurement authorization in an electronic shopping system with improved purchaser/user budget control.

In one aspect, a method for generating an automatic authorization of shopping carts created during a procedure of electronic procurement of goods or services depending on values stored in a database table is described. Each employee or user has a User-defined Budget to his disposal, e.g. an amount of money assigned to a user for buying goods or services. Opposite to the 'Spending Limit' approach known in the state of the art, the User-defined Budget-value really is a kind of budget, which can be spent and is determined for a certain time period. By ordering goods or services the costs are added within the time period and compared whether added costs exceed the User-Budget. If so, then the current shopping has to go through manager's approval, otherwise an automated approval workflow is started. The added costs are updated, if during approval a manager or requestor rejects or changes or adds items. Initialization of the 'cumulative amount spent' occurs automatically at a first update in a new time period (month, year).

Providing a user with a budget over a time period is like an approval, which happens in advance. The budget is used to regulate the employee's buying authorities and to distribute available money among employees. Assigning of a certain User-defined Budget to an employee is a delegation of authority to buy. It removes unnecessary administrative expenditures and thus shortens the time of procurements.

In one embodiment the method for generating an automatic authorization includes values stored in a database table. In another embodiment the data is retrieved from two database tables. The first database table includes at least one of a user identification, budget-value, currency and time period for the budget-value. The second database table includes at least one of a user identification, cumulative amount spent, currency and spending-date.

Details of one or more implementations are set forth in the accompanying drawings and the description below. Other features and advantages may be apparent from the description, the drawings, and the claims.

BRIEF DESCRIPTION OF THE DRAWINGS

FIG. 1 shows a generic computer system used to implement current invention.

FIG. 2 shows an exemplary network topography used to implement current invention.

FIG. 3 shows a flow chart of the process after the shopping cart has been saved for further processing.

FIG. 4 shows a flow chart of the sub process for the budget check.

MODE FOR THE INVENTION

Referring now to the drawings, in which like numerals represent like elements throughout the several figures, aspects of the present invention and the exemplary operating environment will be described.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a micro-processor-based or programmable consumer electronics device, a mini-computer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semi-conductor media, like DRAM SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviations to express actions by a computer that is controlled by a program.

FIG. 2 shows an exemplary network topography used to implement current invention. In a company's electronic procurement system a potential user/purchaser connects to an electronic shop using a desktop computer 900 through a computer network 990. Usually a remote computer 901 running a respective computer program, e.g. an electronic commerce software application, provides access to the electronic shop server 902, which holds data representing a catalog of items for sale. The items may include at least one of goods and services. Also connected to the network 990 is the data repository 910, which holds the data assigned to the user in particular relevant for using the electronic shop. The structure of the repository 910 and data it holds is described later on. The electronic commerce software application server 901 and the electronic shop server 902 may be distributed over the networks In another embodiment they may be different services running physically on the same machine. After accessing the electronic shop a showcase containing representations of items available in the shop is displayed on the screen to the user.

FIG. 3 shows a flow chart of the process. By selecting representations of the items to be ordered and by putting the items into a representation of a shopping cart the user creates a list of items. The list comprises descriptions of the selected items including item number, price, etc. In the following when referring to the shopping cart the list of items is always included. By selecting and deselecting different items in process 11 the shopper changes the shopping cart until all required items are entered. At the end of the selection procedure the shopping cart is saved in process 12 for further processing. The expression saving the shopping cart is intended to include action when a user selects a single item for purchase without creating a shopping cart explicitly.

The flow chart of FIG. 3 shows in its left branch the process after the shopping cart has been saved for further processing. Each time a shopping cart gets saved by process 12, a check is performed by process 13 whether or not a sufficient budget is still available to the specific user. Process 13 is described in detail referring to FIG. 4.

To check whether or not a sufficient budget is still available to the specific user, the necessary information is loaded from a database table 33,34 by process 26. The information includes data representing the budget-value assigned to the user, the time period for the budget, the cumulative amount spent by user in previous purchases, the spending-date, which is the date when a previous purchase happened The data is stored in one database table. In another embodiment the data is stored in two database tables. The first one 33 contains fields representing the User ID, the budget-value, the currency of budget-value, and the time period for the budget The second one 34 contains fields representing the User ID, the cumulative amount spent, the currency of cumulative amount spent, and the 'spending-date' activity. By splitting the information between two database tables it is easy to assign budget-values to individual users that are defined either as attribute in the organizational structure or as personalized objects for a role, in which the user is acting, or as personalized object directly assigned to the user.

The field 'cumulative amount spent' represents the total monetary sum of all items a specific user has already ordered in the current time period.

The field 'spending-date' represents the previous date a specific user has placed an order. It is replaced by the current date according to rules described later on.

All fields in the second table or, if only one database table is used, the respective fields in the first table, are first filled with data during the first shopping activity of the respective user.

After getting the above-described data in process 26 first the field 'spending-date' is compared to the current date in process 27. If the time period corresponding to the value of 'spending-date' does not correlate to the actual time period for the budget, then the value of the cumulative amount spent is set to the initial value, which equals zero by process 28. Additionally the field 'spending-date' is set according to the current date by process 29.

On the other hand the value of cumulative amount spent remains unchanged, if the time period corresponding to the value of 'spending-date' lies inside the actual time period for the budget. Processing continues directly with process step 30

Next in process step 30 the total monetary value of the items in the shopping cart is calculated and added to the 'cumulative amount spent'. The resulting sum Σ is compared with the budget-value in process 30, also. If the sum Σ is greater than the budget value a message is created in process 31. The message includes the amount exceeding the budget value and is not displayed right away but stored for later use. If the sum Σ is smaller than or equals the budget-value assigned to the user processing continues directly with process step 32. Process step 32 returns to the calling process.

Referring now again to FIG. 3, if process 14 determines that the sum Σ is smaller than or equals the budget-value assigned to the user, an automated approval for the procurement is generated by process 15. In the next process step 19 of the procedure the database is updated by saving the sum as the 'cumulative amount spent'. At the same time the shopping cart is forwarded to create the required number of purchase orders by process 21. The purchase orders are preferably in electric form and directly sent to the respective vendors.

If process 14 determines that the sum exceeds the budget-value assigned to the user, process 16 prompts the user the message created by step 31 additionally asking either to accept the shopping cart as it is or to make changes in the selection of items.

In the first case a workflow for management approval will be stared according to the approval workflow defined in the procurement system. In the latter case the user is guided back to the virtual shop and enabled to make changes to the contents of his shopping cart in order to fulfill the requirements for the automated approval. Process 17 directs the flow of prosecution according to the decision.

If changes are to be made on the contents of the shopping cart the processing is continued with process 11.

Before on the other hand an approval workflow is started, the database is updated by saving the sum as the 'cumulative amount spent' by process 18. After the approval workflow process 20 approval only changes in the shopping cart, which were initiated during are taken into account The changes comprise deletion of the whole shopping cart, deletion of one or several items, replacement of items, and addition of items. If the shopping cart contains items after approval the shopping cart is forwarded to create the required number of purchase orders by process 21 as pointed out before.

In the following the procedure for generating an automated approval is summarized:

Retrieve (Read out) 'budget-value' assigned to user from organizational model or personalized data from first table 33 and retrieve (Read out) 'cumulative amount spent' assigned to user from second table 34 by process 26. If there is no entry, set 'cumulative amount spent' to initial value, which is zero.

Determine if the time period of the current date (purchase/order date) corresponds to the time period of 'spending-date' read out from the second table in process 27. If not, set 'cumulative amount spent' to initial value, which is zero in process 28, and set value of 'spending-date' to current date in process 29.

Calculate a new cumulative amount spent $\Sigma$ by adding the sum of values of the items in the shopping cart and the 'cumulative amount spent'. If the new cumulative amount spent $\Sigma$ does not exceed the 'budget-value' generate an automated authorization by process 15 and update value of 'cumulative amount spent' in database table by process 19. If the new cumulative amount spent $\Sigma$ exceeds 'budget-value' an authorization according to the authorization workflow 20 as outlined before is required after updating the value of 'cumulative amount spent' in database table by process 18. After obtaining the required authorization, usually by means of an electronic workflow allowing the authorizing person to leave the shopping cart unchanged or to remove items from or to add items to the shopping cart, the value of 'cumulative amount spent' is updated by the value of the new cumulative amount spent calculated according to content of the authorized shopping cart If the shopping cart is not changed during the authorization workflow, no update in the database tables is necessary.

In an example embodiment the virtual shop includes a further button, which can be activated by a user. Upon activation a procedure is initialised, which performs a check 22 on the budget available to the user. Thus a user can check on the remaining budget before saving the shopping cart. Process consists of the steps outlined above omitting the steps of saving the data or creating the purchase order as shown in FIG. 3.

In the following the procedure to check the budget is summarized:

Retrieve 'budget-value' assigned to user from organizational model or personalized data (first table).

Retrieve 'cumulative amount spent' assigned to user from second table. If there is no entry, set 'cumulative amount spent' to initial value, which is zero.

Determine if the time period of the current date purchase/order date) corresponds to the time period of 'spending-date' read out from the second table. If not, set 'cumulative amount spent' to initial value, which is zero, and set value of 'spending-date' to current date.

Calculate a new cumulative amount spent by adding the sum of values of the items in the shopping cart and the 'cumulative amount spent' from database.

Compare the new cumulative amount spent with the 'budget-value' 23 and generate a respective message 24 on the screen informing the user about the exceeding budget value.

When a shopping cart waiting for approval crosses time periods, the total value is added to the 'amount spent' of the current time period when it is finally approved. So it is impossible to transfer budgets to a new time periods.

A number of embodiments of the invention have been disclosed. Nevertheless, it will be understand that various modifications may be made without departing from the spirit and scope of the invention. Accordingly, other embodiments are within the scope of the following claims.

The invention claimed is:

1. A computer-implemented method for generating an automatic authorization of a shopping cart created during electronic procurement of items depending on at least one value stored in a database table, comprising:
   retrieving, by a processor, data from the database table, the data including a data representing a budget-value and a data representing a cumulative amount spent during a specified time period assigned to a user performing the electronic procurement;
   calculating, by the processor, a total value of the items in the shopping cart;
   comparing, by the processor, a sum of the value of the cumulative amount spent and the total value of the items in the shopping cart with the budget-value;
   if the sum is less than or equal to the budget-value,
      generating, by the processor, the authorization, and
      updating, by the processor, the value of the cumulative amount spent by the total value of items in the shopping cart;
   if the sum is greater than the budget-value, generating an indication indicating that the budget-value is exceeded, wherein the retrieved data is retrieved from a first database table having organizational data objects and a second database table having personalized data objects, and the retrieved data retrieved from the first database table includes a user identification, a budget value set for the user, and a time period for the budget-value, and the retrieved data retrieved from the second database table includes a user identification, cumulative amount spent by the user, and a spending-date, and
   setting the cumulative amount spent in the second database table to an initial value, if a time period of a current date does not correspond to a time period of the spending-date.

2. The method of claim 1, wherein the items include one of goods and services.

3. The method of claim 1, further comprising:
   setting the spending-date in the second database table to the current date, if the time period of the current date does not correspond to the time period of the spending-date.

4. The method of claim 1, wherein the indication includes one of a request for changing a content of the shopping cart, and a request for further authorization.

5. An article, comprising:
   a computer readable non-transitory medium that stores executable instructions, the executable instructions causing a computer system to:
      retrieve data from a database table including data representing a budget-value, data representing a time period for the budget-value, data representing a cumulative amount spent during the time period, and data representing a spending-date, each respectively being assigned to a user performing an electronic procurement;
      calculate a total value of items in a shopping cart created during the electronic procurement by the user;

compare a sum of the value of the cumulative amount spent and a value of the items in the shopping cart with the budget-value;

if the sum is less than or equal to the budget-value, generate an authorization, and update the value of the cumulative amount spent by the value of the items in the shopping cart; and if the sum is greater than the budget-value, generate an indication indicating that the budget-value is exceeded, retrieve data from a first database table having organizational data objects and a second database table having personalized data objects, retrieve data from the first database table including a user identification, a budget value set for the user, and a time period for the budget-value, and retrieve data from the second database table including a user identification, cumulative amount spent by the user, and the spending-date, set the cumulative amount spent to an initial value, if a time period of a current date does not correspond to a time period of the spending-date.

6. The article of claim 5, further comprising:
at least one executable instruction causing the computer system to set a value of the spending-date to the current date, if the time period of the current date does not correspond to the time period of the spending-date.

7. The article of claim 5, further comprising:
at least one executable instruction causing the computer system to create one of a request to change a content of the shopping cart and a request to get further authorization.

8. A system of generating an automatic authorization of a shopping cart created during an electronic procurement of an item depending on a value stored in a database table, the system comprising:

an information retrieval means for getting data from the database table including data representing budget-value, time period for the budget-value, cumulative amount spent, and spending-date assigned to the user performing the electronic procurement;

computing means for calculating the total value of items in the shopping cart, and for comparing the sum of the value of cumulative amount spent and the value of items in the shopping cart with the budget-value, and for generating the authorization and updating the value of cumulative amount spent by the value of items in the shopping cart if the sum lies within the budget-value, and for generating an indication indicating that the budget is exceeded, wherein the data is retrieved from a first database table having organizational data objects and a second database table having personalized data objects, the data retrieved from the first database table includes a user identification, a budget value set for the user, and time period for the budget-value, and the data retrieved from the second database table includes a user identification, cumulative amount spent by the user, and spending-date, and an information storage means for setting the cumulative amount spent to an initial value, if the time period of the current date does not correspond to the time period of spending-date.

9. The system of claim 8, wherein the information storage means sets the value of spending-date to the current date, if the time period of the current date does not correspond to the time period of the spending-date.

10. The system of claim 8, wherein the item includes at least one of goods and services.

11. The system of claim 8, wherein the indication includes one of a request for changing the content of the shopping cart and a request for further authorization.

12. A system for generating an automated procurement authorization in an electronic shopping system, comprising:

networking means for allowing a user to access a server managing a shop;

display means for displaying representations of items available in the shop for selecting, each item having a value, and a shopping cart on a screen to the user;

selection means for allowing the user to select items to be purchased on the screen and to put the selected items into the shopping cart;

retrieving means for getting data from the database table including data representing budget-value, time period for the budget-value, cumulative amount spent, and spending-date assigned to the user performing the electronic procurement;

computing means for memorizing a budget-value assigned to the user and a first variable representing the cumulative amount spent in the user's previous procurement transactions, for updating the first variable by the value of the selected items in the shopping cart, and for comparing the first variable with the budget-value;

approval means for generating the automated procurement authorization, if the first variable is smaller than the budget-value, and for generating a message on the screen to the user, if the first variable exceeds the budget-value, wherein the data is retrieved from a first database table having organizational data objects and a second database table having personalized data objects, the data retrieved from the first database table includes a user identification, a budget value set for the user, and time period for the budget-value, and the data retrieved from the second database table includes a user identification, cumulative amount spent by the user, and spending-date, and an information storage means for setting the cumulative amount spent to an initial value, if the time period of the current date does not correspond to the time period of spending-date.

13. A computer-implemented method for generating an automated procurement authorization in an electronic shopping system wherein a client accesses an electronic shop through a computer network, comprising:

displaying, by a processor, representations of items available in the shop for selecting, each item having a value, and a shopping cart on a screen to the user;

selecting, by the processor, items to be purchased and putting the selected items into the shopping cart;

retrieving, by the processor, data from the database table, the data including a data representing a budget-value and a data representing a cumulative amount spent during a specified time period assigned to a user performing the electronic procurement;

updating, by a processor, a first variable representing the cumulative amount spent in the user's previous procurement transactions by the value of the selected items in the shopping cart;

comparing, by the processor, a budget-value assigned to the client with the first variable, and for the first variable with the budget-value; and approving, by the processor, for generating the automated procurement authorization, if the first variable is smaller than the budget-value, and for generating a message on the screen to the user, if the first variable exceeds the budget-value, wherein the data is retrieved from a first database table having organizational data objects and a second database table having personalized data objects, the data retrieved from the first database table includes a user identification, a budget value set for the user, and time period for the budget-value, and the data retrieved from the second database table includes a user identification, cumulative amount spent by the user, and spending-date, and setting the cumulative amount spent in the second database table to an initial value, if a time period of a current date does not correspond to a time period of the spending-date.

* * * * *